US011250529B2

(12) United States Patent
Kyemba et al.

(10) Patent No.: US 11,250,529 B2
(45) Date of Patent: Feb. 15, 2022

(54) COMPUTER-AIDED DISPATCH INCLUDING AUTOMATIC DIVERSIONS

(71) Applicant: Intergraph Corporation, Madison, AL (US)

(72) Inventors: Heather Ruth Kyemba, Huntsville, AL (US); Joshua Bret Cooley, Madison, AL (US)

(73) Assignee: Intergraph Corporation, Madison, AL (US)

( * ) Notice: Subject to any disclaimer, the term of this patent is extended or adjusted under 35 U.S.C. 154(b) by 435 days.

(21) Appl. No.: 15/263,958

(22) Filed: Sep. 13, 2016

(65) Prior Publication Data

US 2018/0075559 A1 Mar. 15, 2018

(51) Int. Cl.
*G06Q 50/26* (2012.01)
*G06Q 10/06* (2012.01)
(Continued)

(52) U.S. Cl.
CPC ........... *G06Q 50/26* (2013.01); *G06Q 10/047* (2013.01); *G06Q 10/06315* (2013.01); *G06Q 10/063114* (2013.01); *G06Q 10/0833* (2013.01)

(58) Field of Classification Search
None
See application file for complete search history.

(56) References Cited

U.S. PATENT DOCUMENTS 6,106,459 A   8/2000   Clawson
6,198,394 B1  3/2001   Jacobsen et al.
(Continued)

FOREIGN PATENT DOCUMENTS

CN   102063665 B   5/2013
CN   104867340 A   8/2015
(Continued)

OTHER PUBLICATIONS

S. Yang, Integrated Management of Emergency Vehicle Fleet, Aug. 7, 2006, University of Maryland Libraries DRUM (Year: 2006).*
(Continued)

*Primary Examiner* — Patricia H Munson
*Assistant Examiner* — Chesiree A Walton
(74) *Attorney, Agent, or Firm* — Nutter McClennen & Fish LLP (57) ABSTRACT

Embodiments of the present invention disclose a computer-implemented methodology for automatically indicating in a computer-aided dispatch system for a plurality of assignable participants, such as emergency vehicles, to be dispatched to one of a plurality of facilities, whether a facility is in a diverting status or a receiving status. A centralized database receives a change in status for a vehicle for use in determining the status of a facility. In response to receiving the change in status for the vehicle, the status information about the vehicle including a current status and a prior status is transmitted to one or more client programs. A client program receives the current status and the prior status of the vehicle and uses the current status and prior status of the vehicle along with a criteria set to determine if any of the plurality of facilities' status should be changed from receiving to diverting or from diverting to receiving.

20 Claims, 9 Drawing Sheets

(51) Int. Cl.
*G06Q 10/04* (2012.01)
*G06Q 10/08* (2012.01)

(56) References Cited

U.S. PATENT DOCUMENTS

| | | | |
|---|---|---|---|
| 6,952,164 | B2 | 10/2005 | Junqua |
| 7,091,852 | B2 | 8/2006 | Mason et al. |
| 7,245,216 | B2 | 7/2007 | Burkley et al. |
| 7,976,480 | B2 | 7/2011 | Grajales et al. |
| 8,428,961 | B2 | 4/2013 | Greischar et al. |
| 8,478,418 | B2 | 7/2013 | Fahey |
| 2003/0055934 | A1 | 3/2003 | Lincke |
| 2003/0069680 | A1 | 4/2003 | Cohen et al. |
| 2004/0243446 | A1* | 12/2004 | Wyatt ............ G06Q 10/02 705/2 |
| 2008/0046285 | A1* | 2/2008 | Greischar ........ G06Q 10/00 705/2 |
| 2008/0267360 | A1 | 10/2008 | Spector |
| 2008/0278311 | A1 | 11/2008 | Grange et al. |
| 2010/0214118 | A1 | 8/2010 | Losee et al. |
| 2012/0218102 | A1 | 8/2012 | Bivens et al. |
| 2012/0286933 | A1 | 11/2012 | Hsiao |
| 2013/0073302 | A1* | 3/2013 | Ryan ............... G06Q 10/06 705/2 |
| 2014/0167955 | A1 | 6/2014 | Mahajan |
| 2015/0264550 | A1 | 9/2015 | Johnson et al. |
| 2015/0278732 | A1* | 10/2015 | Fiedler ............ G06Q 50/26 705/7.22 |
| 2016/0100302 | A1* | 4/2016 | Barash ............ G16H 40/20 455/404.2 |
| 2016/0192166 | A1 | 6/2016 | deCharms |

FOREIGN PATENT DOCUMENTS

| | | |
|---|---|---|
| JP | 2001-325689 | 11/2001 |
| JP | 2004-252854 | 9/2004 |
| JP | 2014-219854 | 11/2014 |

OTHER PUBLICATIONS

C. Chan, Using Future Information to Reduce Waiting Times in the Emergency Department via Diversion ,Columbia University, Manufacturing & Service Operations Management • Mar. 2016 (Year: 2016).*

Cheng et al., Impact of Ambulance Dispatch Policies on Performance of Emergency Medical Services, Feb. 4, 2011, IEEE Transactions on Intelligent Transportation Systems ( vol. 12, Issue: 2, Jun. 2011) (Year: 2011).*

IEEE, "Monitoring of Arduino-based PPG and GSR Signals through an Android Device," IEEE Engineering in Medicine Biology Society (EMBS) International Student Conference (ISC) 2016 Design Competition, 106 pages, 2016.

Kurniawan et al., "Stress Detection from Speech and Galvanic Skin Response Signals," IEEE 26th International Symposium on Computer-Based Medical Systems (CBMS), 6 pages, Jun. 20-22, 2013.

Popkin et al., "A Preliminary Examination of Railroad Dispatcher Workload, Stress and Fatigue," U.S. Department of Transportation, Federal Railroad Administration, Office of Research and Development, Washington, DC, Foster-Miller, Inc.—Final Report, 146 pages, May 2001.

Villarejo et al., "A Stress Sensor Based on Galvanic Skin Response (GSR) Controlled by ZigBee," MDPI Open Access, Sensors, vol. 12, No. 5, pp. 6075-6101, May 10, 2012.

Korbinian Frank, Authorized officer European Patent Office, International Search Report—International Application No. PCT/US2017/047976, dated Nov. 17, 2017, 15 pages, togeter with the Written Opinion of the International Searching Authority.

International Searching Authority, International Search Report—International Application No. PCT/US2017/067009, dated Feb. 23, 2018, together with the Written Opinion of the International Searching Authority, 15 pages.

Examination Report for Australian Application No. 2017325801 dated Jun. 9, 2020. 4 pages.

Examination Report for European Patent Application No. 17 761 406.2 dated Apr. 17, 2020. 7 pages.

Office Action for Canadian Patent Application No. 3,036,679 dated Apr. 27, 2020. 6 pages.

* cited by examiner

DIVERT WARNING

*Facility Entrance HHPEDS on Divert Status for:*
*GED*

| Service | Type | Caller | Phone | Expiration Date | Expiration Time |
|---------|------|--------|-------|-----------------|-----------------|
| GED | Manual | | | 7/1/2016 | 12:25:00 PM |

[ Continue ]  [ Try Again ]

FIG. 9

COMPUTER-AIDED DISPATCH INCLUDING AUTOMATIC DIVERSIONS

TECHNICAL FIELD

The present invention relates to computer-aided dispatch systems, and more particularly to computer-aided dispatch systems that automatically determine whether the status of a facility should be either receiving or diverting vehicles.

BACKGROUND ART

Computer-aided dispatch programs are well known in the art, especially in the assignment of emergency vehicles, such as ambulances, fire vehicles, and police vehicles. Computer-aided dispatch systems may have a call taker that gathers information about an emergency (i.e. verifies the location, type of emergency etc.). This information may be entered into the system by the call taker or automatically populated if the information is received in a digital format. These systems assist dispatchers in assigning tasks for the emergency vehicles based upon criteria such as proximity and type of emergency.

Computer-aided dispatch programs generally consist of a networked computer program associated with the dispatcher that receives information about the status of the emergency vehicles within the system from the emergency vehicles. The type of shared information may include the type of emergency vehicle, the capabilities of the vehicle, the location of the vehicle, and whether the vehicle is available for assignment or in process of responding to an emergency. Thus, a dispatcher can select the correct type of emergency vehicle to assign to an emergency situation.

In addition to keeping track of the emergency vehicles, some computer-aided dispatch programs also track the status of facilities, such as hospitals. The role of the dispatcher in such systems is to efficiently assign an ambulance to an emergency situation and to then assign the ambulance to a hospital. The dispatcher makes assignment decisions based on criteria such as the proximity of an ambulance to a hospital and the capabilities of a hospital. Thus, a dispatcher would prefer to assign an ambulance to the closest hospital, but there may be a restriction on that hospital. The closest hospital may only service general emergency care, while the patient within the ambulance may require specialty treatment, such as cardiac care that is only provided by a second hospital that if further away. Thus, the computer-aided dispatch program tracks the ambulances location and proximity to one or more hospitals while also providing the dispatcher with information about the capabilities of each of the hospitals.

SUMMARY OF THE EMBODIMENTS

In accordance with one embodiment of the invention, a computer-implemented methodology for automatically indicating in a computer-aided dispatch system for a plurality of assignable participants, such as, vehicles to be dispatched to one of a plurality of facilities, whether a facility is in a diverting status or a receiving status. Similarly, an assignable participant may be an individual in certain embodiments. A centralized database receives a change in status for an assignable participant (such as a vehicle) for use in determining the status of a facility. The database may be part of a database management system and may include a plurality of database tables. In response to receiving the change in status for the assigned participant, the status information about the assigned participant including a current status and a prior status is transmitted to one or more client applications. The client application receives the current status and the prior status and uses the current status and prior status along with a criterion set to determine if any of the plurality of facilities' status should be changed from receiving to diverting or from diverting to receiving. Thus, embodiments of the present invention monitor all of the assignable participants that are present within the computer-aided dispatch system and determine the status of the facilities within the computer-aided dispatch system based in part on the status of the assignable participants. In an embodiment of the invention, the assignable participants are vehicles.

In one embodiment of the invention, the facilities are health care facilities and the vehicles are emergency vehicles. It should be recognized that each facility may have a separate criteria set for determining if the facility should be entered into a diverting status or a receiving status.

In certain embodiments, the status of a vehicle may include: available or arrived at facility. In other embodiments of the invention, the status of a vehicle may include: available, assigned to an event, arrived at an event, or arrived at facility.

The criteria set can include a preset number of vehicles allowed to be present at a facility before a diversion is required. In other scenarios, the criteria set can include a predetermined length of time that a preset number of vehicles can remain at a facility before a diversion is required. In other embodiments, the criteria set may include a number of entrances for the facility. In still other embodiments, the criteria set may also include a health-care specialty type. In even other embodiments of the invention, the criteria set may include the capacity of the health care facility including the capacity in terms of the number of beds available, the number of doctors available, or the number of doctors available by a specific specialty.

In embodiments of the invention, the computer-implemented methodology maintains a database of current status for a plurality of vehicles within the computer-aided dispatch system.

The criteria set for a facility may include a temporal criteria. If time is a factor in the criteria set, the status of one or more vehicles at different points in time are necessary for evaluating the criteria set.

Embodiments of the invention may also include a computer-implemented system for providing automatic diversion status updates in a computer-aided dispatch system for dispatching one of a plurality of vehicles to one of a plurality of facilities. The system may include a database that receives and stores changes in status of vehicles within the system. The database may receive the change information from a mobile client associated with a vehicle. The system may also include a trigger program that responds to a change in status within the database of a vehicle and obtains the previous status for the vehicle and the current status for the vehicle. In certain embodiments of the invention, the trigger program transmits the previous and current states for the vehicle. In certain embodiments, the trigger program inserts change information into a database table, such as a change_record table. The system may also include an automatic diversions module that receives and uses the current state and previous state for the vehicle along with a criterion set associated with a facility for determining if the facility should be in a diverting state or a receiving state.

The computer-implemented system may also include a mobile server that receives from the mobile client associated with the vehicle a change in status and provides the change in status to the database. The computer-implemented system may further include a dispatcher client application that receives a transmission from the automatic diversions module that indicates to a user that one or more of the facilities are in a diverting state. The dispatcher client may display to a user the status of all of the facilities within the computer-aided dispatch system. In certain embodiments, when a dispatcher is trying to determine which hospital to send an ambulance to, and the dispatcher selects a facility that is in the diverting status, a visual notice, such as the generation of window, is presented to the dispatcher and includes a query for the dispatcher whether the dispatcher wishes to continue with the selection of the facility. In certain embodiments, it should be recognized that the dispatcher may issue a dispatch command for dispatching a unit to an emergency location and then issue a separate transport command for assigning a unit to a recommended facility. As used in the present disclosure, the term "dispatch" shall apply to both dispatching a unit to an emergency location and also sending a transport command to a vehicle indicating a recommended facility.

In embodiments of the invention, the dispatcher client in response to input from a dispatcher or other user sends a dispatch command to the mobile server to dispatch a vehicle to a facility within the computer-aided dispatch system.

In certain embodiments of the invention, the trigger program reformats the current state and previous state for the vehicle into an XML file format. The system may also include a change publisher application that parses the XML file format and transmits the current state and previous state to one or more applications as a series of packets within the network.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Definitions. As used in this description and the accompanying claims, the following terms shall have the meanings indicated, unless the context otherwise requires:

The term "facility" shall mean a building that has one or more associated entrances where a vehicle may stop to load or unload people, such as in the case of an ambulance at a hospital or things, such as merchandise at a retail chain store. In general, a facility houses a company or organization and the facility has an associated function or functions. For example, if the facility is a healthcare facility, the facility may serve the function of a hospital. The hospital itself may have one or more specialties, such as emergency care, pulmonology, cardiology, eye care, psychiatry, cancer, nephrology, gastroenterology, gynecology and others. Healthcare facilities may include healthcare services, but are not considered to be a full-service hospital with emergency services, and could include medical specialties such as cardiology; pulmonology; eyes, ears, nose and throat; psychiatry or other specialties. Healthcare facilities may include one or more different types of testing facilities including diagnostic imaging such as x-ray, ultrasound, PET/CTscans, MIll scans and radiology to name, but a few. Facilities may have an associated capacity and a function such as a specialty may also have an associated capacity. For example, a hospital may have 300 beds total (overall capacity), but only 30 beds for cardiac care (cardiac capacity), and 60 beds for pulmonary care (pulmonary capacity). Facilities may also have an associated number of parking spots for drop-off associated with an entrance. For example, a store, which is one of a chain of stores, may have three spaces for vehicles to unload merchandise and a hospital may have four spaces associated with the emergency room entrance of the hospital.

Embodiments of the present invention are directed to computer-aided dispatch systems that allow a user (i.e. a dispatcher) to dispatch vehicles to one of a plurality of facilities. The computer-aided dispatch system includes a module that automatically determines if a facility should be in a diversion state based upon the status of vehicles within the system that are being dispatched. The status of the facility (whether or not the facility is accepting patients or diverting them) assists a dispatcher in determining what facility a particular vehicle should be sent to. A diversion state may occur when a criteria set has been met for that facility. In one embodiment, the criteria set may be that a diversion occurs if there are more than three vehicles at a particular entrance of a healthcare facility for more than 30 minutes. It should be recognized by one of ordinary skill in the art that different criteria could be applied to different facilities based on the capacity and capabilities of the facility.

Figure 1:
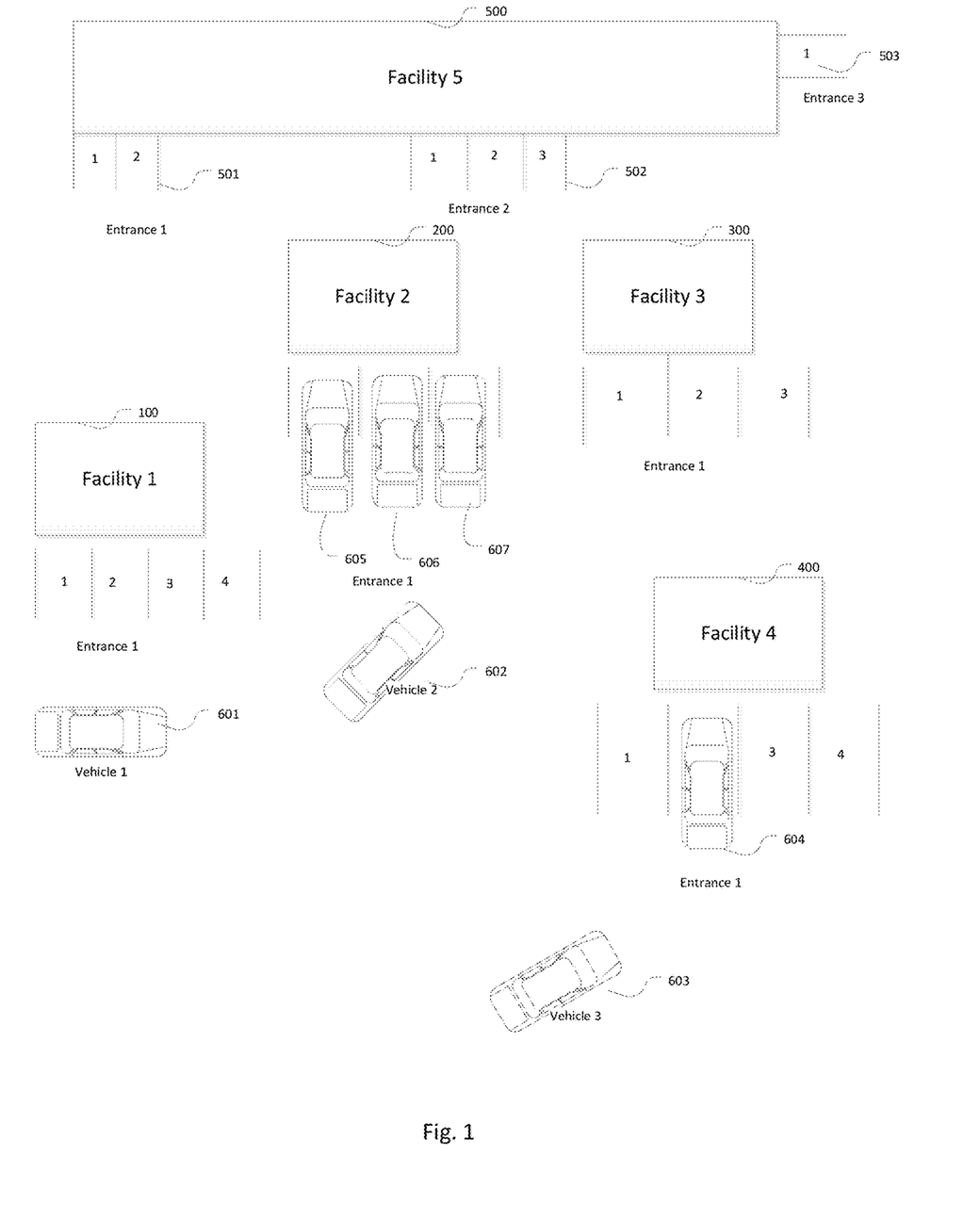
FIG. 1 shows an environment for computer-aided dispatch of vehicles to a plurality of facilities in which conditions at the facility may create a need to have an automatic diversion of vehicles from that facility.

FIG. 1 shows an environment for computer-aided dispatch of vehicles to a plurality of facilities in which conditions at the facility may create a need to have an automatic diversion of vehicles from that facility. FIG. 1 shows five different facilities each having different capacities for loading and unloading. For the remainder of this application, the facilities will be referred to as healthcare facilities and the vehicles will be referred to as emergency vehicles, such as ambulances. It should be recognized that the present invention is not limited solely to dispatch systems for dispatch of emergency vehicles to facilities, but may be appropriate to dispatch systems in general in which automatic diversions are appropriate.

FIG. 1 shows a plurality of emergency vehicles 601, 602, 603 that are either available for dispatch to a facility or to an emergency location or emergency vehicles 604, 605, 606, 607 that are presently located at a facility. Each facility has an associated entrance with one or more parking spots for an emergency vehicle. Facilities 100, 200, 300, and 400 each have one entrance, Facilities 100 and 400 have 4 parking spots while facilities 200 and 300 have 3 parking spots. Facility 500 is shown as having multiple entrances. This may be a large hospital that has different departments associated with the different entrances (e.g. emergency entrance, psychiatry entrance, pediatric entrance). As shown, facility 500 has three different entrances each with a different number of parking spots for loading and unloading of patients. The computer assisted dispatch system allows a dispatcher that is in communication with the plurality of vehicles to direct a vehicle to emergency events for picking up patients or to direct the vehicle to facility for dropping-off of the patient at a healthcare facility.

As shown in FIG. 1 facility 200 has all of its parking spots filled by emergency vehicles and therefore would be a candidate to have the facility's status changed to divert. In the process of dispatching vehicles to facilities and/or emergency locations, the computer-automated dispatch system takes into account the location of each vehicle and its proximity to each of the facilities. For example, if vehicle 602 had already picked up a patient, the closest facility would be facility 200, however since all of the parking spots are occupied by vehicles, the computer-automated dispatch system would use a criteria set to determine if facility 200 is in a diverting status (diverting emergency vehicles) or a receiving status (receiving emergency vehicles). If the criteria set for an automatic diversion is simply based on the availability of parking spots, facility 200 would be put into a diverting status associated with the facility and the dispatcher would be encouraged to dispatch emergency vehicle 602 to another facility such as facility 100, 300, 400, or 500. The dispatching of an emergency vehicle to a facility may have its own criteria set. For example, a specific specialty of a facility may be a first criteria and proximity of the emergency vehicle to the facility may be a second criteria. Assuming that there is no specific specialty associated with the emergency/patient, then the criteria is simply the distance to an available facility. The dispatch system would indicate that facility 100 is the closest facility and the dispatcher could dispatch the emergency vehicle to facility 100.

Figure 2:
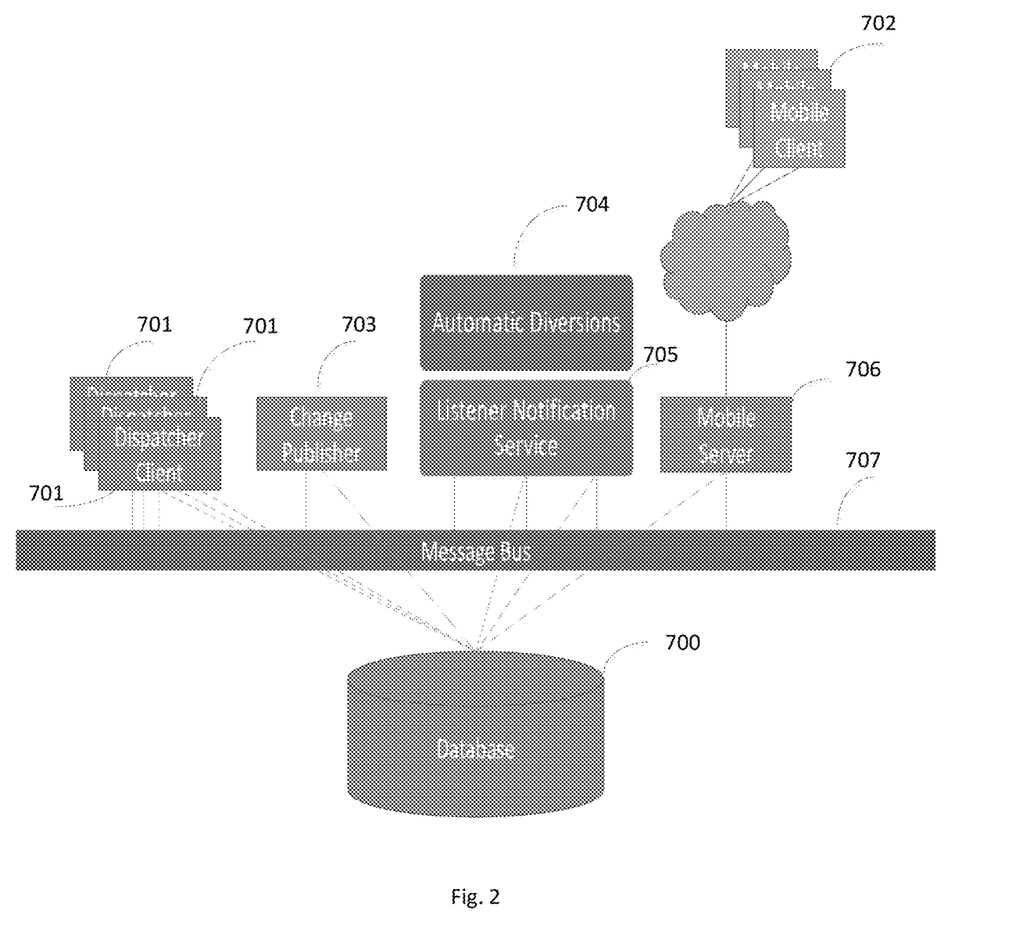
FIG. 2 is an exemplary computer environment showing components for providing the creation and clearing of automatic diversions of facilities that can be used by a dispatcher in a computer aided dispatch system.

FIG. 2 is an exemplary computer environment showing components for creating and removing automatic diversions in a computer-aided dispatch system. A database 700 is used to collect and share data among a plurality of clients through a message bus 707 about the status of both facilities and vehicles that are part of the dispatch system. As used herein the term "client" is taken in relationship to the database server, so that all applications that send or receive data from the database server are considered to be clients of the database server. The database is centrally located and is in communication with one or more dispatcher clients 701. The database 700 contains one or more triggers that record change information, such as a change in the status of a facility or a vehicle to a database table, such as a change_record table. The change publisher service reads the change_record table, and broadcasts changes over the message bus. The listener notification service receives these changes and forwards them onto the automatic diversion modules. The automatic diversion module determines if a diversion needs to be created or cleared (removed). The mobile server reads the diversion information when generating facility recommendations. The mobile server than transmits that information to its mobile clients.

The dispatcher client 701 is a computer application used by a human dispatcher for communicating with the vehicles of the system. The communications from the dispatcher client 701 are directed through a mobile server 706 through the Internet or radio network 708 and on to one or more mobile clients 702 that are associated with the vehicles in the system. The human dispatcher that operates the dispatcher client 701 or the personnel in a mobile vehicle can override automatic status changes. The automatic diversion status changes are provided to assist the dispatcher in assigning an emergency vehicle to a specific healthcare facility. The dispatcher client 701 receives status updates about the state of the currently operational vehicles and facilities. One of ordinary skill in the art will recognize that the database may be one or more separate database tables that contain associations. The database may be part of a database management system that includes software for defining, creating, updating and administering the databases within the system.

A current operational vehicles database stores information about logged in units (e.g. vehicles) such as their agency, current status, if they have been assigned to an event (e.g. an emergency) and the event identifier. When a vehicle logs onto the system through a mobile client application 702, a row is inserted into a current operational vehicles database. When a vehicle's property or status changes, the row in the database is updated with the changed information. When the vehicle logs off through the mobile client application the row in corresponding database for the vehicle is deleted.

In one embodiment of the invention, a system administration tool allows a user, such as a dispatcher to assign triggers associated with columns in one or more database tables. The changes to a table are monitored via a database trigger program. The trigger program launches after inserts, updates and deletes, and records information about the monitored database columns. In one embodiment of the invention, a separate database called the change_record table stores the changes information in a distributable format, such as in XML. The trigger program, in addition to retrieving the changes to the database as the changes are made may also reformat the changes for storage in the change_record table. An important feature of the trigger program is that the triggers program records both the old value and the new value for any of the monitored parameters. By recording this information in the change_record table in a distributable format, the changes can be readily distributed. Each time a change_record row is inserted, the row is timestamped with the current data and time.

The change publisher module accesses the change_record table to obtain updated information about the status of the facilities and vehicles. The change publisher module includes an algorithm that first checks to see if there is new data in the change-record database table. The change publisher module only retrieves rows that are newer than a certain threshold. By default, the change publisher module ignores rows that were inserted more than a predetermined time ago (e.g. ten minutes). The change publisher will distribute only the most current data in the change_record table. The change publisher module will publish the change_record table in a distributable format (i.e. JSON, WL) by sending out a series of listener packets on the message bus. Listener packets have a defined protocol format that is recognizable by client programs that include a listener notification service 705. The listener notification service will identify listener packets and will provide the packets to the automatic diversion module. As shown in FIG. 2 the listener notification service 705 will receive the listener packets and reformat the packets into the change_record table and pass this table to an automatic diversions module 704.

The automatic diversions module 704 receives the change_record table in a format such as XML, and identifies the status change information that is provided. The automatic diversions module includes criteria set that can be user-defined (i.e. dispatcher or system administrator) to determine if a facility should have the status of either receiving (receiving vehicles at the facility) or diverting (diverting vehicles from the facility). The criterion set uses the changed status information about the status of one or more vehicles in the system along with the previous status for the same vehicle(s). By having both the prior and current status of the vehicles, the automatic diversions module does not need to create a cache of the status of each vehicle within the system in order to determine the status for the facilities in the system. Examples of the criteria set and algorithm employed by the automatic diversion module will be described in more detail below. When the automatic diversion module has determined that the status of a facility should be changed (from receiving to diverting or diverting to receiving), the automatic diversion module transmits a message onto the message bus that gets distributed to each of the subscribing clients that are listening for the message including the dispatcher client and also the mobile server which will transmit the changes to the mobile client for display within the vehicles. In addition, the status of the facility is updated and stored in the database.

Figure 3:
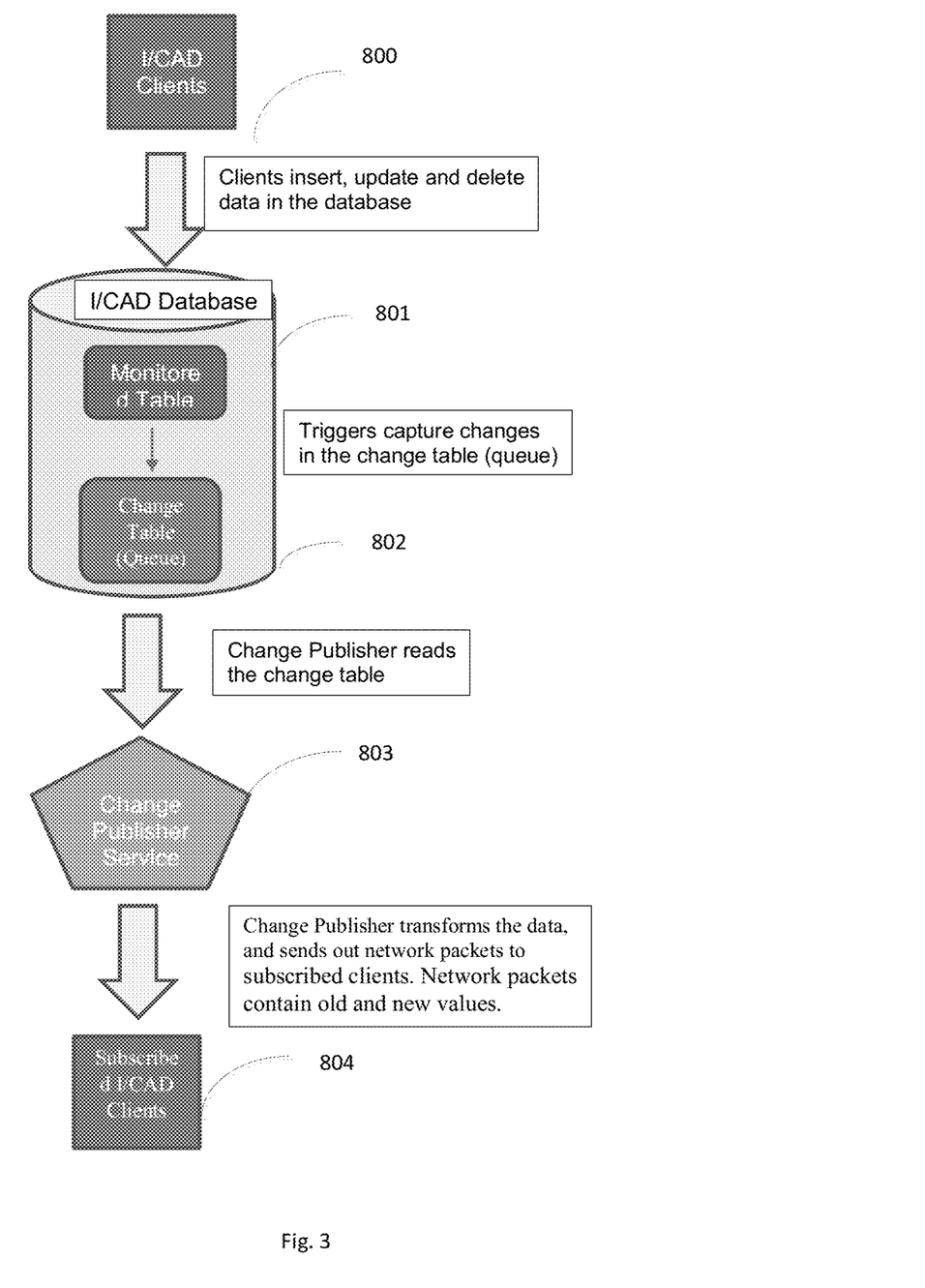
FIG. 3 shows the communications between the clients and the database along with the change publisher monitor module for intercepting changes to database entries.

FIG. 3 shows the communications between the clients and the database along with the change publisher monitor module for intercepting changes to database entries. FIG. 3 provides more detail about the process of how status changes that are transmitted to the database are intercepted and provided to one or more subscribed clients. The subscribed clients include the dispatcher clients and the listener notification service, which forwards the information to the automatic diversion module. First a client, such as the mobile client 702 from FIG. 2 changes its status 800 (e.g. from arrived at facility 1 to available). The status fields for a particular vehicle may include such parameters as (agencyID, Dispatch Group, Facility Entrance ID, Is in Emergency ID, Is dispatched, location (longitude and latitude), availability, dispatch time, at facility, arrival time at facility, enroute time to emergency, enroute time to facility, total number of patients transported etc.) Other parameters may also be associated with a vehicle beyond the noted parameters without deviating from the intended scope of the invention. Of particular importance are the status fields of "at facility," "arrival time at facility," and "availability." The status change is distributed from the client device to the centralized database (identified as the I/CAD database in FIG. 3). In certain embodiments of the invention, a dispatcher may receive a radio request for a change in status of a vehicle in the system and the dispatcher or other person updates the status of the vehicle on behalf of the vehicle. Additionally, the status of a vehicle may be updated through a software agent, which receives GPS coordinate data from smartphones and other GPS devices associated with assignable participants such as vehicles and individuals. If an assignable participant's new location is within a certain proximity of a facility, the GPS agent can automatically place the assignable participant (usually a vehicle but possibly a person on foot with a smartphone) in transport arrive status.

The data is first updated in the current operational vehicles table, which is part of the main database for the system. 801 A trigger program monitors the database for changes in specific status parameters including: at facility, arrival time at facility, and availability. The trigger program captures the changes and the previous status in the change_record table within the database. 802 The change publisher application constantly accesses the change_record table to see if any records have been created. The change publisher application transmits the changes to the subscribed clients. The automatic diversion module applies an algorithm to change data, identifying particular fields of interest and whether the field of interest has been updated (e.g. at facility (which facility), arrival time at facility (time), and availability (available for dispatch or unavailable due to either being at a facility or being enroute to an emergency or to a facility). Embodiments of the present system are contemplated as being used in real-time dispatch systems. Because of the real-time nature of the system, data must be kept current so that a change in status that is old, e.g. 10 minutes old, may be ignored and the database may be poled again to see if any newer changes have occurred. If a change has occurred to the status of a particular data field in the database that the trigger applications are monitoring, the change publisher application will access the previous and current status and prepare this data for transmission. The change publisher application transforms the data into a distributable format, such as XML or JSON. Other known formats for distributing data may also be used. XML and JSON are contemplated, since these formats have become ubiquitous in the computer industry and especially in the Internet.

The change publisher application then transmits the reformatted data and distributes the data as networked packets that include both the current and the old status of the relevant fields.

Figure 4:
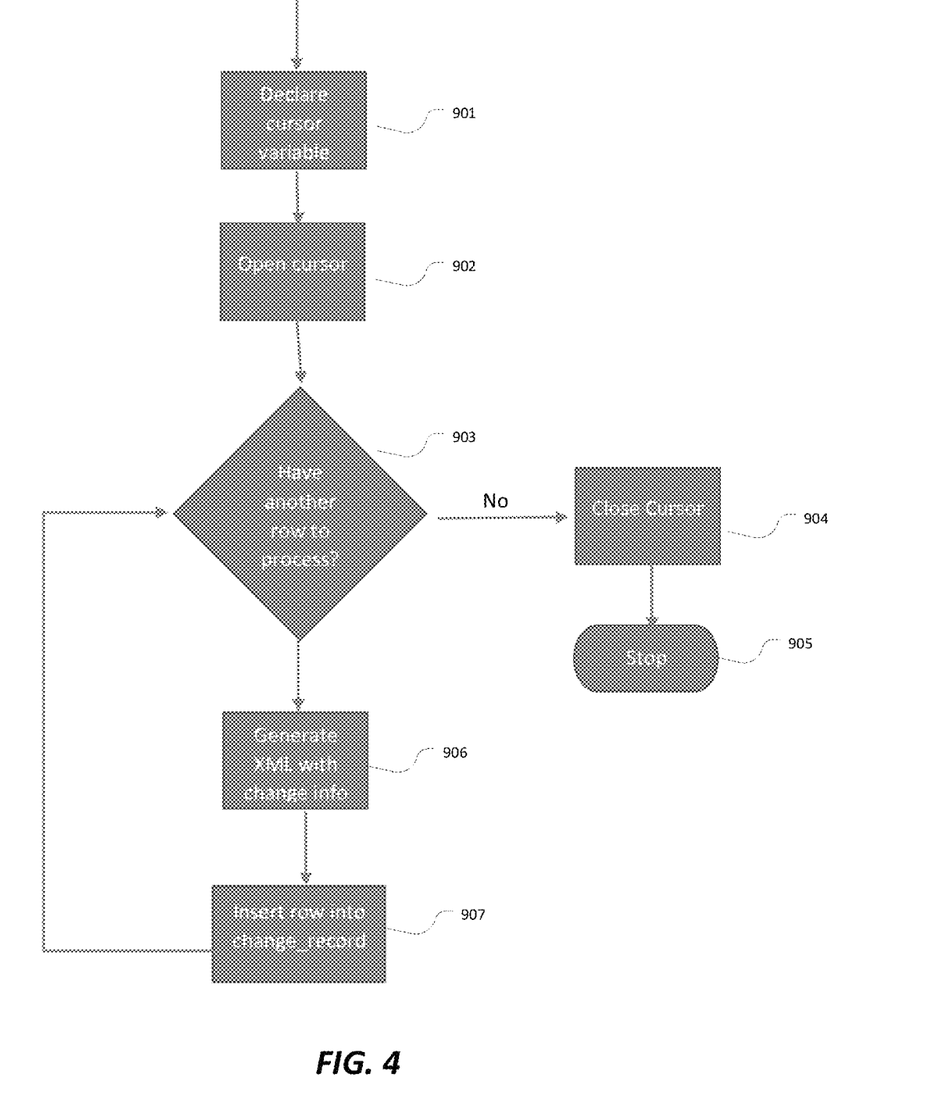
FIG. 4 is a flow chart of the steps taken by the trigger program in capturing changes made to the database.

FIG. 4 is a flow chart of the steps taken by the trigger program in capturing changes made to the database. The trigger program gathers the information of what has changed in the database and converts the data to an XML representation that is then stored as XML in the change_record table of the database. The trigger uses the inserted and deleted pseudo-tables, which a server, such as, a Microsoft® SQL server, exposes to allow the old and new values of the changed information to be gathered.

First, a variable is declared that represents the cursor 901. The trigger program defines the cursor variable that will contain data for inserts, updates and deletes. The cursor is then opened 902. The database table is next accessed and positioned at the first row of the database. The trigger program inquires "is there another row to process of the database?" 903. If the answer is "no" the cursor is closed 904 and the process is stopped 905. If there is another row, the trigger program generates XML with the information that has changed in the row. 906. The trigger program then inserts this new row into the change_record database 907. When a row is inserted, only the inserted pseudo-table has data. When a row is deleted, only the deleted table has data. When a row is updated, the deleted table has the old values and the inserted table has the new values. Thus, by accessing the deleted table and the inserted table, both the old and new values for a parameter are gathered.

Figure 5:
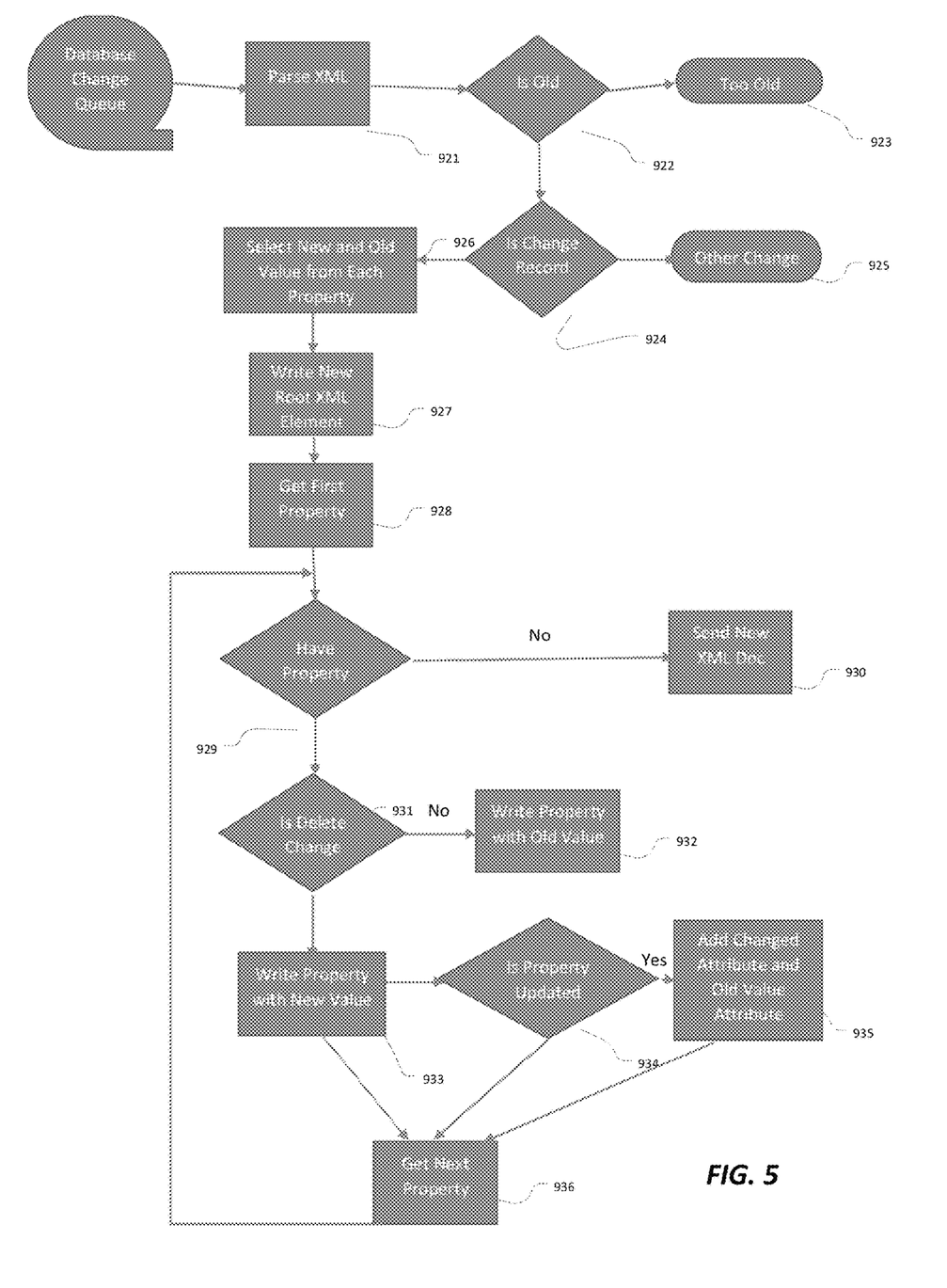
FIG. 5 shows a flow chart of steps taken by the change publisher application when processing data from the database change records table.

FIG. 5 shows a flow chart of steps taken by the change publisher application when processing data from the database change records table. The change publisher application accesses the change records table and first parses the document in the table that has been created by the triggers program. The database provides the values from the table in a format that is specific to the database provider. The XML parser converts each database value from the database representation to an XML data type that will be used to extract the data from the document 921. The change publisher queries change_record table, ignoring old data (i.e. is out of date) 922. Using the XML data type the change publisher obtains data that reflects the number of seconds since the change to the database record was queued. If the data is out of date in accordance with a predetermined threshold value, the change publisher does not forward the data. 923 If the data is not out of date, the change publisher application checks to see if the root node of the XML document is set to Change Record 924. If the answer is "yes" to the query, then the input document is a change record document that will contain change record data. If it is not a Change Record document the document is discarded 925. A change record document includes property elements with both new and old values in the XML, document format. The property elements that are listed as NewPropertyValue and OldPropertyValue are selected from all property elements in the XML document and are placed into a list 926. Next, a new XML document is created with a root node having the name of the type specified in with the appropriate entity type name 927. The change publisher application then begins to loop through the properties that have been added to the list in 926 and obtains the first property 928. The query have property is used to indicated that the list has been completely parsed. 929 If there is no property when the search for a first property or next property occurs, then the change publisher application is complete and the New XML document can be sent out for transmission to clients. 930. The application next queries "is the change a delete?" 931. The input document is considered a delete if the element in the input document contains the value of "delete" for a parameter. If the answer to the query is "no," then the application writes the property with the old value. 932. This adds a new child element with the name of the property that is added to the root element of the new document and the value of the element is the old value from the list. If the answer is "yes" to "Is the change a delete?" then a new child element with the name of the property is added to the root element of the new document. The value of the element is the old value from the list. The application then queries, "Is the property updated?" If the new value in the list does not match the old value in the list, then the property was updated. 934 If the comparison of the old and new values indicated that the property has been updated, then the application adds an attribute to the new child element with the name old value and its value and also adds the new value from the list. 935. If the property is not updated and therefore the answer is "no," the unchanged value is added from the list. The application then gets the next property 936 and loops back to block 929.

The following exemplary LINQ query in the change publisher application reads the XML data from the change_record table and transforms the information into the XML format for transmission to subscribed clients. var properties=(from p in notificationXml.Descendants ("Property")

```
select new PropertyDetails
{
    PropertyElement = p,
    NavPropertyElement = (XElement)null,
    Name = (string)p.Element("PropertyName"),
    IsNav = false,
    Changed = (string)p.Element("OldPropertyValue") !=
(string)p.Element("NewPropertyValue")
})
.Union
(from p in notificationXml.Descendants("Property")
from np in p.Descendants("AssociatedNavigationProperty")
where (bool)p.Element("IsUsedInAssociation")
select new PropertyDetails
{
    PropertyElement = p,
    NavPropertyElement = np,
    Name = (string)np.Element("NavigationPropertyName") +
    "Reference",
    IsNav = true,
    Changed = (string)p.Element("OldPropertyValue") !=
(string)p.Element("NewPropertyValue")
})
.OrderBy(p => p.Name)
.GroupBy(g => g.Name);
```

Provided below is a sample xml document that could be generated by the change publisher application and sent to client applications within the network of the computer-aided dispatch system. In the below sample, the unit status value has changed from an old value of 13 to a new value of 14. In the exemplary embodiment, a unit status of 13 indicates "transport", meaning the ambulance is transporting a patient to a hospital. A unit status value of 14 indicates the ambulance is in "transport arrive" status. Meaning the ambulance has arrived at the recommended hospital with a patient.

```
<cs:ActiveUnitData xmlns:sd="http://schemas.datacontract.org/
2004/07/System.Data" xmlns:cs="http://schemas.datacontract.org/2004/
07/Intergraph.IPS.ChangeSubscription.Objects " cs:action="update">
    <cs:ActiveCrewReference>
        <sd:EntityContainerName>CacheObject</sd:EntityContainerName>
        <sd:EntityKeyValues>
            <sd:EntityKeyMember>
                <sd:Key>CrewId</sd:Key>
                <sd:Value></sd:Value>
            </sd:EntityKeyMember>
        </sd:EntityKeyValues>
        <sd:EntitySetName>ActiveCrewData</sd:EntitySetName>
    </cs:ActiveCrewReference>
    <cs:AgencyDispatchGroupReference>
        <sd:EntityContainerName>CacheObject</
sd:EntityContainerName>
        <sd:EntityKeyValues>
            <sd:EntityKeyMember>
                <sd:Key>AgencyId</sd:Key>
                <sd:Value>HXPD</sd:Value>
            </sd:EntityKeyMember>
            <sd:EntityKeyMember>
                <sd:Key>DispatchGroup</sd:Key>
                <sd:Value>METRO</sd:Value>
            </sd:EntityKeyMember>
        </sd:EntityKeyValues>
        <sd:EntitySetName>AgencyDispatchGroupData</
sd:EntitySetName>
    </cs:AgencyDispatchGroupReference>
    <cs:AgencyId>HXPD</cs:AgencyId>
    <cs:CrewId />
    <cs:DispatchGroup>METRO</cs:DispatchGroup>
    <cs:FacilityEntranceId>VA-ER</cs:FacilityEntranceId>
    <cs:FacilityEntranceReference>
        <sd:EntityContainerName>CacheObject</
sd:EntityContainerName>
        <sd:EntityKeyValues>
            <sd:EntityKeyMember>
                <sd:Key>FacilityEntranceId</sd:Key>
                <sd:Value>VA-ER</sd:Value>
            </sd:EntityKeyMember>
```

```
      </sd:EntityKeyValues>
      <sd:EntitySetName>FacilityEntranceData</sd:EntitySetName>
    </cs:FacilityEntranceReference>
    <cs:Status cs:changed="true" cs:oldValue="13">14</cs:Status>
    <cs:UnitId>DONU</cs:UnitId>
  </cs:ActiveUnitData>
```

Figure 6:
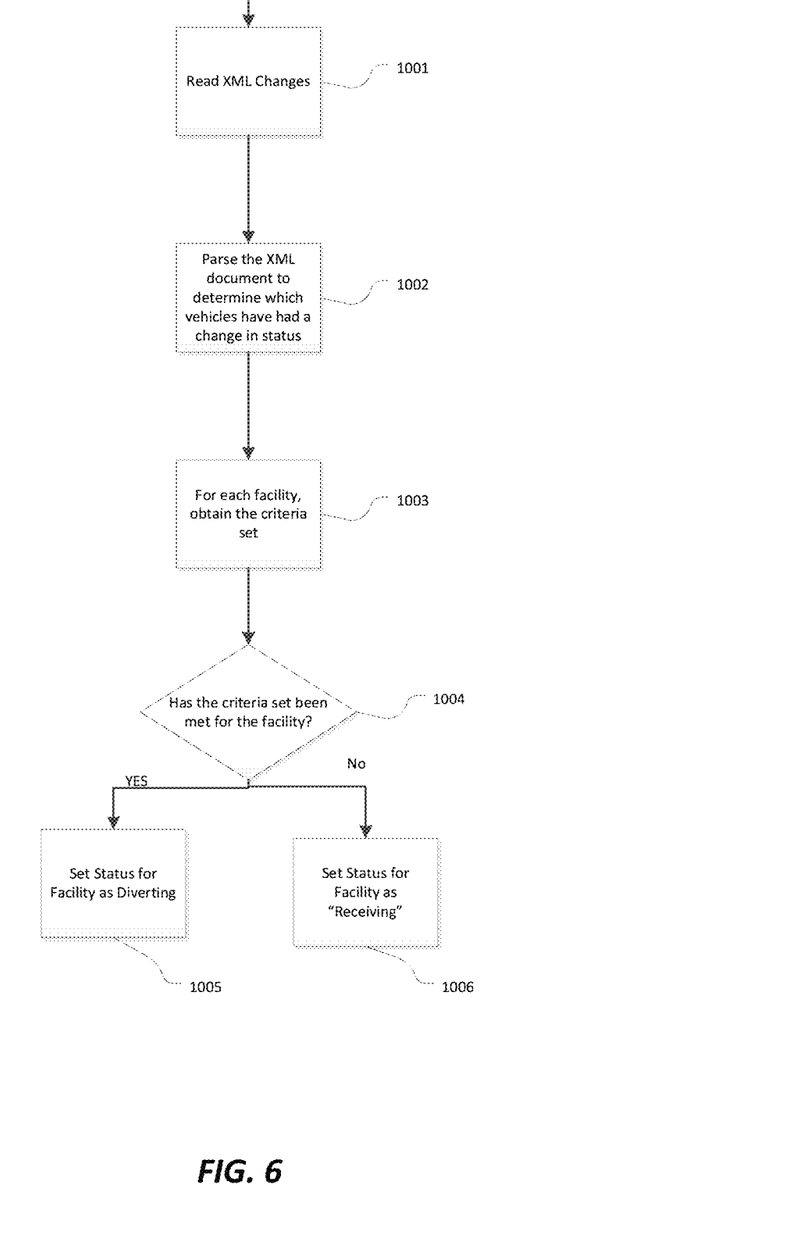
FIG. 6 is an exemplary flow chart of the computer-implemented methodology employed by the automatic diversion module to determine the status of a facility for either creating a diversion away from that facility or removing a diversion for the facility.

FIG. 6 is an exemplary flow chart of the computer-implemented methodology employed by the automatic diversion module to determine the status of a facility. The automatic diversion module will either create a diversion diverting ambulances away from that facility or clearing a diversion for the facility. The automatic diversion module performs an algorithm with a criteria set for determining if one or more of a predefined set of criteria have been met for the facility to put the facility in the status of a diversion. The automatic diversion module also determines if a diversion should be cleared, that is, if the status for a facility should be changed from "diverting" to "receiving".

In one embodiment, a diversion is indicated if more than three emergency vehicles remain at an entrance of a facility for more than 30 minutes. It should be obvious to those skilled in the art that other parameters may be used to identify a diversion and that the diversion criteria may be facility dependent. For example, the criteria may be based on the number of parking spots for the facility, the amount of time that the parking spots have been filled, the capabilities of the facility, whether the capacity of the facility for a particular capability has been exceeded (e.g. hospital X only has 10 cardiac beds and all of the beds have been filled, hospital Y only has two pulmonary surgical teams and both teams are in surgery etc.) or any number of parameters and combinations of parameters.

In certain embodiments of the invention, it is critical that both the old and new status for a parameter associated with a vehicle in the system is provided to the automatic diversion module, since the criteria for the diversion is either based on a temporal component or based on knowledge of the previous status of the vehicle. In the example in which the criteria for a diversion is based on three vehicles being at a facility for more than 30 minutes, the automatic diversion module needs to know the current status of the vehicle, how long the vehicle has been in that status and also the prior status. Thus, if three vehicles had been in the arrived status at facility 1 for more than 30 minutes and one of the vehicles current status has changed to "available" a cancel diversion will be signaled and transmitted to the clients. The automatic diversion engine will assess the status of each vehicle within the system in order to determine whether a facility is in a diverting status or in a receiving status whenever a change in at least one vehicle's status occurs.

The criteria set for a facility may be entrance dependent in certain embodiments. For example, a vehicle that is at a first entrance of hospital X that is at full capacity moves to a second entrance at hospital X wherein the second entrance obtains full capacity upon the arrival of the vehicle. Thus, when this change in status for the emergency vehicle is presented to the automatic diversion module, the automatic diversion module will assess the status for each entrance of the facility and the first entrance will transition from a status of diverting to a status of receiving and the second entrance will transition from a status of receiving to diverting.

The criteria set for a facility may also be based on the capacity and capabilities of the facility. As indicated above, facilities may have certain functions and capacities for those functions. For example, a hospital may have a function of "receiving general emergencies", and also may include the further functions for receiving in patients requiring a specialist such as a "cardiac surgeon" or a "pulmonary surgeon". Associated with each function can be a capacity, such as, a hospital having a total number of emergency room doctors or emergency room beds, a total number of cardiac surgeons and a number of cardiac surgeons that are presently available or in surgery. This information can be used by the automatic diversion module to determine whether the status for a facility should be changed.

As shown in FIG. 6 first, the automatic diversion module receives notice, in the form of an XML document that includes the changes, from the change publisher application that one or more vehicles within the computer-aided dispatch system has had a change in status. 1001 The automatic diversion module then parses the data received from the change publisher application to determine which vehicles have had a change in status and what the old and current status is for each vehicle 1002. The automatic diversion module then obtains the criteria set for each facility 1003. The status for each vehicle including the old and current status are evaluated within the algorithm that includes the criteria set for determining if a diversion for each facility/or entrance to a facility should be set 1004. If the criteria are met for a facility/entrance, the status is automatically changed to "diverting" 1005 if the criteria set is not met for the facility, the facility will be placed in the "receiving" status 1006. This flowchart repeats until all of the facilities have been evaluated. It should be recognized by one of ordinary skill in the art that each criteria set may be based upon one or more parameters of the vehicles within the system and may include logical elements for evaluating the criteria set.

Figure 7:
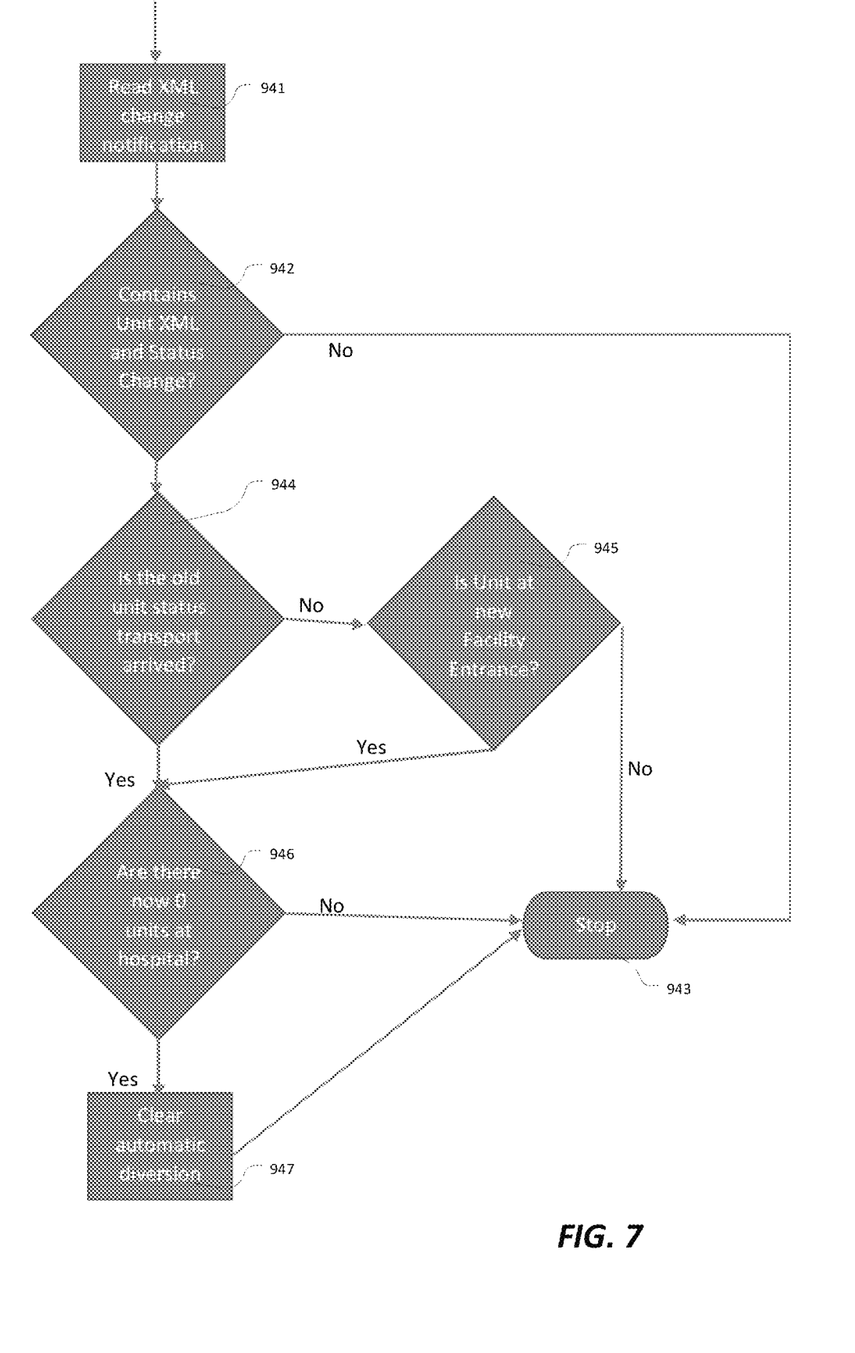
FIG. 7 is an exemplary flow chart that the automatic diversion module uses to clear diversions wherein a criteria for the diversion requires that there are more than one vehicle at a particular entrance of the facility.

FIG. 7 is an exemplary flow chart that the automatic diversion module uses to clear diversions wherein a criteria for the diversion requires that there is more than one vehicle at a particular entrance of the facility. First, the automatic diversion module reads the XML, change notification 941. It should be recognized that this flow chart may be applied for each emergency vehicle within the computer-aided dispatch system and further may be applied for each facility within the system. The process inquires whether the file received from the change publisher application contains information about a vehicle (units) and the status change for the vehicle 942. If the answer is "no," then the process stops 943. If the answer is "yes," the automatic diversion module inquires if the old unit status is "transport arrived" indicating that the emergency vehicle had arrived at a facility for unloading of a patient at a previous point in time 944. If the answer is "yes" then the automatic diversion module inquires "are there now 0 units at the hospital (i.e. facility)?" 946. If the answer is "yes," the automatic diversion status is cleared for the hospital 943. This automatic diversion clearing is then sent out to all of the clients and is received by both the dispatcher client(s) and the mobile client(s) to let the client know of the status change for the facility. If the answer is "no" the automatic diversion module inquires "is the unit (vehicle) at a new facility entrance?" 945. If the answer is "yes," then the automatic diversion module checks to see if there are now zero units at the current facility entrance under evaluation 946. If the answer is "no" the process stops. If the answer is "yes," the automatic diversion status is cleared changing the status from "diverting" to "receiving" 947.

Figure 8:
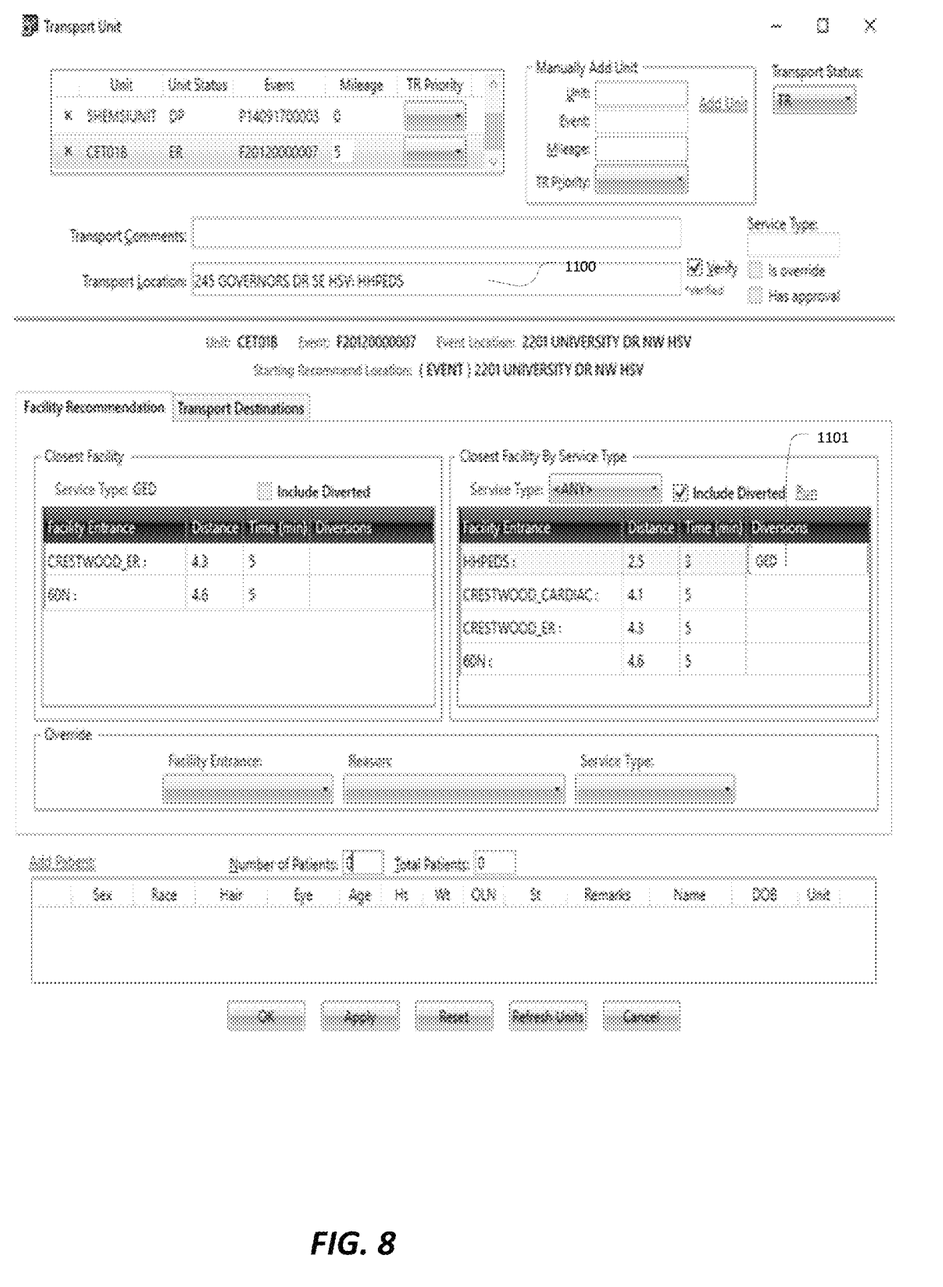
FIG. 8 is an exemplary screen shot that is provided to a dispatcher within the computer aided dispatch system.

FIG. 8 is an exemplary screen shot that is provided to a dispatcher within the computer aided dispatch system. As shown, the dispatcher is provided with an emergency situation that is occurring at "245 Governors Dr." 1000. The dispatcher is running the transport unit command, which tells the unit (emergency vehicle) to transport their patient to a particular hospital (facility). The dispatcher is provided with a listing of possible facility recommendations that are based upon the distance from the emergency location to the facility and the anticipated time in transit. Although the facility HHPEDS is the closest facility (only being 2.5 miles away) from the emergency location, the facility has a diversion associated with the facility of "GED" or general emergency diversion 1101. Thus, the dispatcher can choose to send the patient to HHPEDS aware of the diversion, or the dispatcher can send the emergency vehicle to the next closest facility, such as crestwood_cardiac or crestwood_er, which are within 4.1 and 4.3 miles of the emergency.

Figure 9:
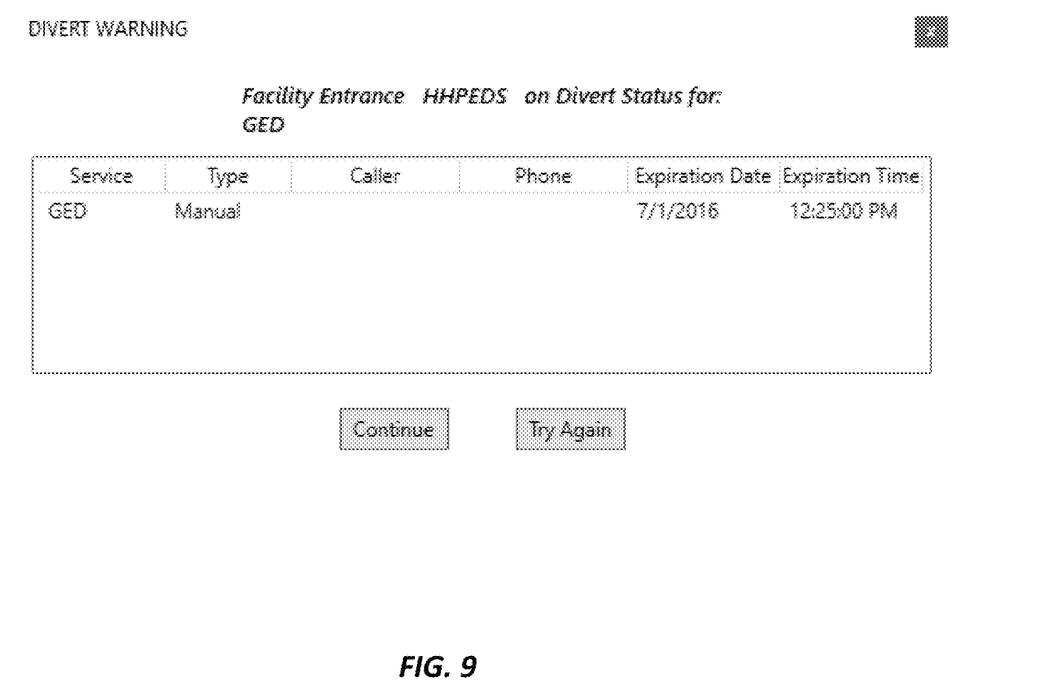
FIG. 9 is an exemplary screen shot that is provided to dispatcher if the dispatcher attempts to send a vehicle to a facility that has a status of "diverting".

FIG. 9 is an exemplary screen shot that is provided to dispatcher if the dispatcher attempts to send a vehicle to a facility that has a status of "diverting". If the dispatcher decided in FIG. 8 to select HHPEDS as the facility to dispatch the emergency vehicle, the dispatcher would receive the warning message that the facility is in the "diverting" status, and the dispatcher can decide to continue and send the emergency vehicle to HHPEDS or the dispatcher can select an alternative location to send the emergency vehicle.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. In an embodiment of the present invention, predominantly all of the reordering logic may be implemented as a set of computer program instructions that is converted into a computer executable form, stored as such in a computer readable medium, and executed by a microprocessor within the array under the control of an operating system.

Computer program logic implementing all or part of the functionality previously described herein may be embodied in various forms, including, but in no way limited to, a source code form, a computer executable form, and various intermediate forms (e.g., forms generated by an assembler, compiler, networker, or locator.) Source code may include a series of computer program instructions implemented in any of various programming languages (e.g., an object code, an assembly language, or a high-level language such as Fortran, C, C++, C#, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.)

Hardware logic (including programmable logic for use with a programmable logic device) implementing all or part of the functionality previously described herein may be designed using traditional manual methods, or may be designed, captured, simulated, or documented electronically using various tools, such as a hardware description language (e.g., VHDL or AHDL), or a PLD programming language (e.g., PALASM, ABEL, or CUPL.)

While the invention has been particularly shown and described with reference to specific embodiments, it will be understood by those skilled in the art that various changes in form and detail may be made therein without departing from the spirit and scope of the invention as defined by the appended clauses. As will be apparent to those skilled in the art, techniques described above for panoramas may be applied to images that have been captured as non-panoramic images, and vice versa.

Embodiments of the present invention may be described, without limitation, by the following clauses. While these embodiments have been described in the clauses by process steps, an apparatus comprising a computer with associated display capable of executing the process steps in the clauses below is also included in the present invention. Likewise, a computer program product including computer executable instructions for executing the process steps in the clauses below and stored on a computer readable medium is included within the present invention.

What is claimed is:

1. A computer-implemented methodology for automatically indicating, in a computer-aided dispatch system for a plurality of assignable participants to be dispatched to one of a plurality of facilities, whether a facility is in a diverting status or a receiving status, the computer-aided dispatch system comprising:
   a mobile server for communicating with a mobile client over a wireless communication system;
   a dispatcher client coupled to the mobile server for enabling communication with the one or more mobile clients;
   at least one computer-readable medium storing a centralized database of assignable participant status information and at least one criteria set for each of the plurality of facilities, the at least one criteria set defining criteria for determining the diverting/receiving status of the facility based on the status of assignable participants;
   at least one processor coupled to a tangible, non-transitory computer-readable medium having embodied therein computer program instructions which, when run by the at least one processor, execute the method comprising:
   receiving a change in status for an assignable participant from a previous status to a current status at the centralized database;
   recording, by a trigger program, in response to the change in status within the centralized database for the assignable participant, change information about the assignable participant in a change record database including at least the previous status and the current status for the assignable participant;

transmitting, by a change publisher service, real-time changed status information about the assignable participant that is newer than a predetermined threshold, the real-time changed status information including at least the previous status and the current status of the assignable participant;

determining, by the automatic diversions module, using the real-time changed status information of the assignable participant along with the at least one criteria set for a given facility, if the status of the given facility should be changed from receiving to diverting or from diverting to receiving based on the previous status and the current status of the assignable participant;

updating, by the automatic diversions module, facility status information in a facility status database if the status of the given facility should be changed; and communicating, by the automated diversions module, the updated facility status information to the dispatcher client for making dispatch decisions for assignable participants and to the mobile server for communication to the mobile client, wherein said receiving, recording, transmitting, determining, updating, and communicating are performed as an ongoing process performed automatically without human intervention such that facility status is updated on an ongoing basis, wherein the assignable participants are a plurality of vehicles; and wherein the at least one criteria set for a given facility specifies a preset number of vehicles allowed to be present at the facility before a diversion is required.

2. A computer-implemented methodology according to claim 1, wherein the preset number of vehicles is based on a number of parking spots for the vehicles.

3. A computer-implemented methodology according to claim 2, wherein the facilities are health care facilities and the vehicles are emergency vehicles.

4. A computer-implemented methodology according to claim 1, wherein each facility is associated with at least one separate criteria set.

5. A computer-implemented methodology according to claim 1, wherein the status of an assignable participant indicates whether the assignable participant is available or arrived at facility.

6. A computer-implemented methodology according to claim 1, wherein the real-time changed status information further includes how long the vehicle has been in the current status.

7. A computer-implemented methodology according to claim 1, wherein the at least one criteria set further specifies a predetermined length of time that the preset number of vehicles can remain at the facility before a diversion is required.

8. A computer-implemented methodology according to claim 1, further comprising:

maintaining a database of current status for a plurality of vehicles within the computer-aided dispatch system.

9. A computer-implemented methodology according to claim 4, wherein the at least one criteria set for a facility indicates a number of entrances for the facility.

10. A computer-implemented methodology according to claim 4, wherein the at least one criteria set for a facility indicates a healthcare specialty type for the facility.

11. A computer-implemented methodology according to claim 4, wherein the at least one criteria set for a facility includes a temporal component that requires the current status and prior status of one or more vehicles.

12. A computer-implemented system for providing automatic diversion status updates in a computer-aided dispatch system for dispatching one of a plurality of assignable participants to one of a plurality of facilities, the system comprising:

a mobile server for communicating with a mobile client over a wireless communication system;

a dispatcher client coupled to the mobile server for enabling communication with the one or more mobile clients;

a database stored in a computer-readable medium and receiving a change in status associated with an assignable participant from a previous status to a current status; and at least one processor coupled to a tangible, non-transitory computer-readable medium having embodied therein computer program instructions which, when run by the at least one processor, execute:

a trigger program that records, in response to the change in status within the centralized database for the assignable participant from the previous status to the current status, change information about the assignable participant in a change record database including at least the previous status and the current status for the assignable participant;

a change publisher service that transmits real-time changed status information about the assignable participant that is newer than a predetermined threshold, the real-time changed status information including at least the previous status and the current status for the assignable participant;

an automatic diversions module that receives the real-time changed status information about the assignable participant and determines, using the real-time changed status information for the assignable participant along with the at least one criteria set for a given facility, if the status of the given facility should be changed from receiving to diverting or from diverting to receiving based on the previous status and the current status of the assignable participant, update facility status information in a facility status database if the status of the given facility should be changed, and communicate the updated facility status information to the dispatcher client for making dispatch decisions for assignable participants and to the mobile server for communication to the mobile client, wherein the trigger program, the change publisher service, and the automatic diversions module update facility status on an ongoing basis automatically without human intervention, wherein the assignable participants are a plurality of vehicles; and wherein the at least one criteria set for a given facility specifies a preset number of vehicles allowed to be present at the facility before a diversion is required.

13. A computer-implemented system according to claim 12, wherein the preset number of vehicles is based on a number of parking spots for the vehicles.

14. A computer-implemented system according to claim 12, wherein the dispatcher client displays to a user the status of all of the facilities within the computer-aided dispatch system.

15. A computer-implemented system according to claim 12, wherein in response to receipt of a user selection of a facility having a status of diverting, producing a visual notice that the facility is in the diverting status and querying whether the user wishes to continue with the selection of the facility.

16. A computer-implemented system according to claim 12, wherein the dispatcher client, in response to user input, sends a transport unit command to the mobile server to dispatch an assignable participant to a facility within the computer-aided dispatch system.

17. A computer-implemented system according to claim 12, wherein the trigger program reformats the status information for the assignable participant into an XML file format.

18. A computer-implemented system according to claim 17, wherein:
 the change publisher service parses the XML file format and transmits the status information to one or more client devices as a series of packets.

19. A computer-implemented system according to claim 12, wherein the database contains one or more database files that contain status information about the assignable participants and facilities within the computer-aided dispatch system.

20. A computer-implemented system according to claim 12, wherein a change in status for an assignable participant may be set by a mobile client, set by a dispatcher on behalf of the assignable participant, or set by a software agent acting on behalf of the assignable participant.

* * * * *